(12) United States Patent
Takeda et al.

(10) Patent No.: US 6,276,225 B1
(45) Date of Patent: Aug. 21, 2001

(54) BALL SCREW ASSEMBLY

(75) Inventors: Ryuji Takeda; Tetsuhiro Nishide; Hiroshi Niwa; Mitsuaki Honma, all of Tokyo-to (JP)

(73) Assignee: THK Co., Ltd., Tokyo-to (JP)

( * ) Notice: Subject to any disclaimer, the term of this patent is extended or adjusted under 35 U.S.C. 154(b) by 0 days.

(21) Appl. No.: 09/438,961

(22) Filed: Nov. 12, 1999

(30) Foreign Application Priority Data

Nov. 11, 1998 (JP) ............................................... P10-321064

(51) Int. Cl.[7] ............................. F16H 25/22; F16J 15/16
(52) U.S. Cl. ........................................ 74/424.82; 277/354
(58) Field of Search ................................ 74/459, 424.82, 74/424.83; 277/354

(56) References Cited

U.S. PATENT DOCUMENTS

| | | | | |
|---|---|---|---|---|
| 2,793,538 | * | 5/1957 | Sears | 74/459 |
| 4,407,511 | * | 10/1983 | Benton et al. | 277/354 |
| 4,905,533 | * | 3/1990 | Benton et al. | 74/459 |
| 6,023,991 | * | 2/2000 | Yabe et al. | 74/459 |

* cited by examiner

Primary Examiner—Allan D. Herrmann
(74) Attorney, Agent, or Firm—Young & Thompson (57) ABSTRACT

A ball screw assembly includes a screw shaft with a spiral groove, balls along the groove, a nut with the screw shaft relatively rotatable with the balls, and a seal device. A portion of each seal member is radially divided into blocks by plural slits so as to extend from one end surface directing outward in an axial direction of the nut to an axial intermediate portion of the seal member, each block having a pair of end faces, the end faces including one end face directed to a rotational direction of the nut with respect to the screw shaft when the screw shaft is screwed into the nut and another end face opposing to the other end face, this one end face being inclined so as to be gradually displaced, towards an outer peripheral side from an inner peripheral side of the seal member, in a direction reverse to the rotational direction with respect to a radial direction of the nut, and the other end face extending in this radial direction of the nut or in a direction inclined to a side reverse to the one end face with respect to the radial direction of the nut.

8 Claims, 12 Drawing Sheets

BALL SCREW ASSEMBLY

BACKGROUND OF THE INVENTION

The present invention relates to a ball screw assembly provided with a nut having an axial end portion to which a seal member is provided.

A nut of a ball screw assembly is provided with a seal device for preventing foreign matters from invading and for preventing a lubricant filled in the nut from leaking. Various kinds of such seal devices have been proposed, including one example of a ring-shaded seal member having a spiral projection. The seal member is fitted to a ball rolling groove formed on a screw shaft and is mounted on an axial end portion of the nut, and such example has been applied widely to the commercial use. However, there is a possibility of often causing dimensional errors between the screw shaft or the ball rolling groove and the seal members when assembled, and hence, it is difficult to make a complete tight-contact between the inner peripheral surface of the ring-shaped seal member and the screw shaft.

Figure 12A:
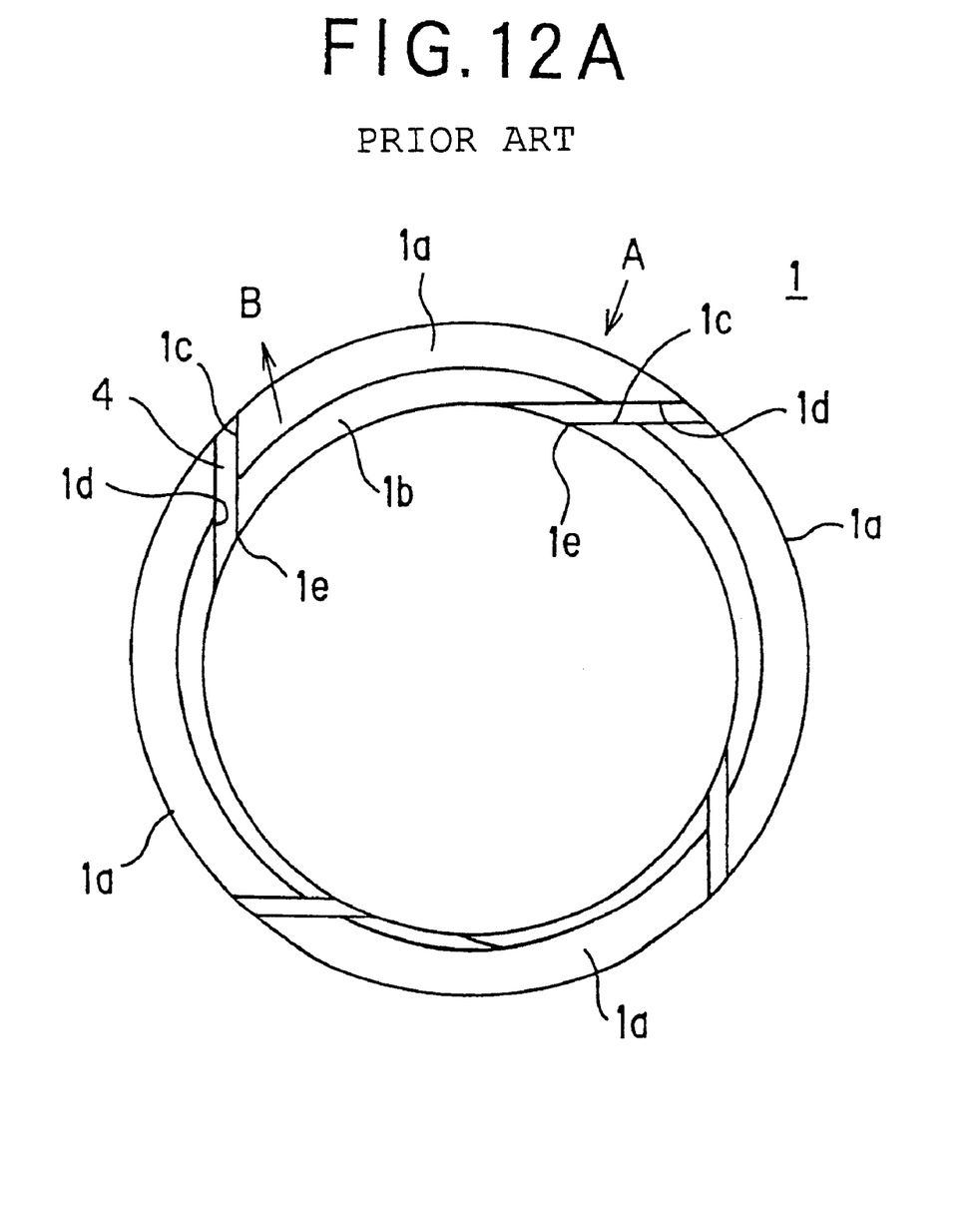
FIGS. 12A and 12B show a seal device mounted on a ball screw unit of conventional structure and includes FIG. 12A being a front view thereof and FIG. 12B being a view showing a using state thereof.
Figure 12B:
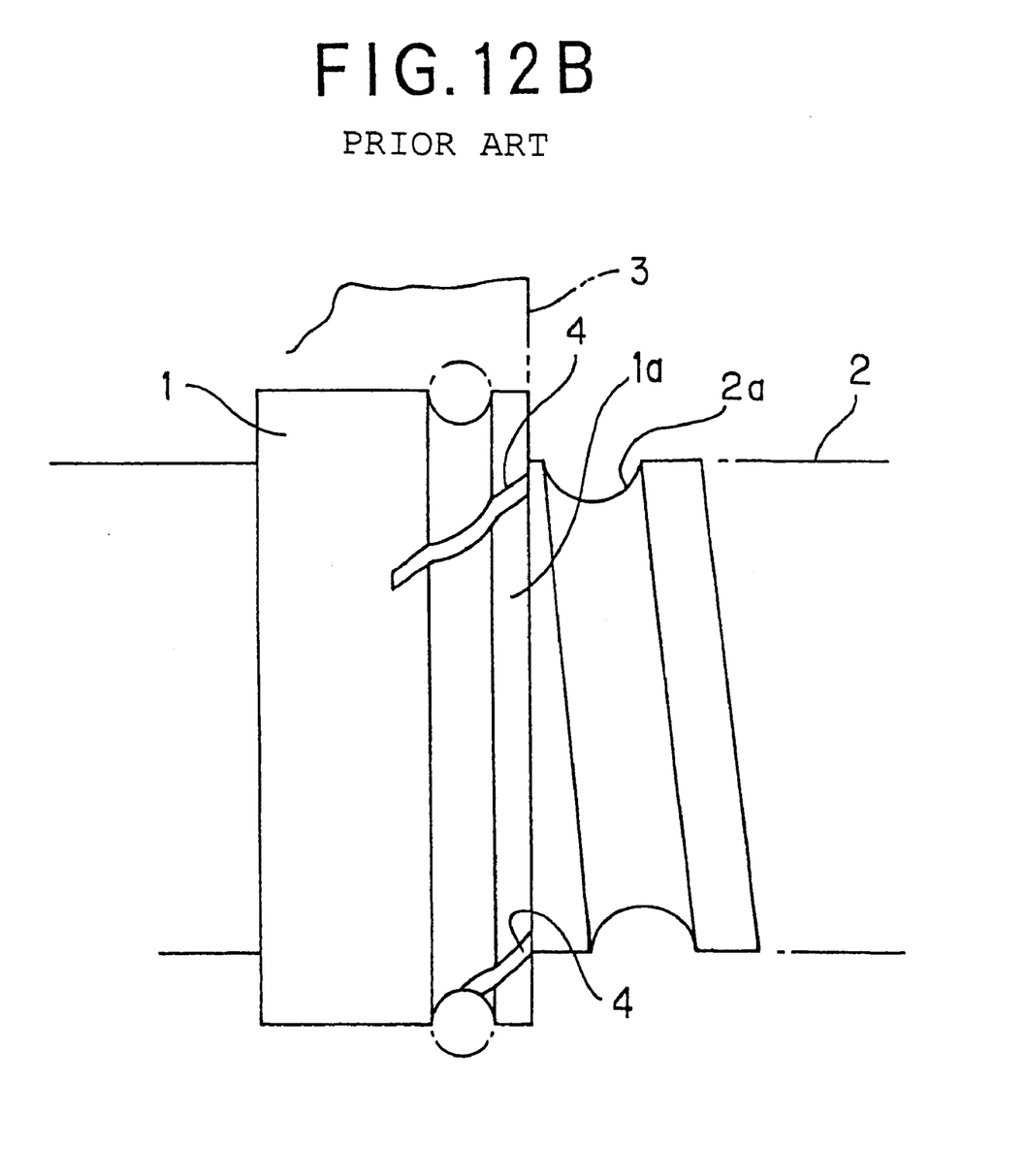

In order to overcome such problem mentioned above, there is provided a seal device as shown in FIGS. 12A and 12B (for example, as disclosed in Japanese Utility Model Laid-open Publication No. HEI 6-6795). With reference to FIGS. 12A and 12B, a portion of a ring-shaped seal member 1 is divided into a plurality of blocks 1a, 1a, - - - , 1a in its circumferential direction. The respective blocks 1a are pushed into a screw shaft 2 so that projections 1b of the blocks 1a can closely contact a ball rolling groove 2a. Opposing divided surfaces 1c and 1d of the adjacent divided blocks 1a, 1a are inclined with respect to the radial direction of the screw shaft 2 and also inclined with respect to the axial direction of the screw shaft 2 in a twisted (spiral) direction of the ball rolling groove 2a.

According to such seal device, since the respective blocks 1a can be displaced or shifted in the radial direction of the screw shaft 2, the respective blocks 1a can surely contact the screw shaft 2 even in the presence of the dimensional error. Moreover, when the screw shaft 2 is screwed into the nut 3, foreign matters sticking on the screw shaft 2 can be scraped by the divided surface 1c of the block 1a directed to the rotational direction of the nut 3 with respect to the screw shaft 2. The scraped foreign matters can be removed outside the outer periphery of the nut 3 and outward in the axial direction in accordance with the inclination of the divided surface 1c.

Incidentally, in the seal member 1 mentioned above, the two divided surfaces 1c and 1d of the adjacent blocks 1a, 1a are substantially parallel to each other and, hence, widths of slits formed between these divided surfaces 1c and 1d of the respective blocks 1a are also substantially constant. Accordingly, the divided surface 1d has a so-called overhang shape in which the divided surface 1d gradually projects in the circumferential direction as being displaced from the inner peripheral side of the seal member 1 towards the outer peripheral side thereof, and hence, the respective blocks 1a have a shape such that a parallelogram is curved along the screw shaft 2 as viewed from the axial direction of the nut 3.

Therefore, when a pushing force is applied, as shown by an arrow A in FIG. 12A, to a portion near the divided surface 1d towards the screw shaft 2 side, it is difficult to receive such pushing force by a portion between the inner periphery of the block 1a and the screw shaft 2, and such pushing force acts to displace the divided surface 1d towards the radial central portion so that the portion near the divided surface 1d makes the width of the slit 4 narrow.

Accordingly, a force acting on the other side of the block a, i.e. the divided surface 1c as shown by an arrow B in FIG. 12A, acting in a direction apart from the screw shaft 2, arises and this force raises the inner peripheral edge 1e of the divided surface 1c from the screw shaft 2. In such a state, when the screw shaft 2 is screwed into the nut 3, the foreign matters sticking on the screw shaft 2 may be caught into the inner peripheral side of the seal member 1.

The divided surface 1c functions as mentioned above when the screw shaft 2 is screwed into the nut 3, however, the foreign matters will be pushed towards the radially central side and axially inside of the nut 3 by the opposing divided surface 1d if the foreign matters are kept in the slit 4 when the screw shaft 2 is screwed out of the nut 3. For this reason, there is a possibility of the foreign matters being caught between the seal member 1 and the screw shaft 2.

SUMMARY OF THE INVENTION

An object of the present invention is to substantially eliminate defects or drawbacks encountered in the prior art mentioned above and to provide a ball screw assembly which improves sealing performance, compared with the conventional structure, of the structure in which a portion of the seal member is divided into a plurality of blocks.

This and other objects can be achieved according to the present invention by providing a ball screw assembly comprising:

a screw shaft formed, at an outer periphery thereof, with a ball rolling groove in shape of spiral;

a number of balls rolling along the ball rolling groove of the screw shaft;

a nut screwed with the screw shaft to be relatively rotatable with the balls being interposed therebetween; and a seal device including seal members mounted on both axial end portions of the nut, the seal member being formed in shape of ring having inner periphery to which a spiral projection to be fitted to the ball rolling groove is formed, wherein a portion of each of the seal members is divided into a plurality of blocks in a circumferential direction thereof by a plurality of slits formed to the seal member so as to extend from one end surface directing outward in an axial direction of the nut to an axial intermediate portion of the seal member, each of the blocks having a pair of end faces in the circumferential direction, the end faces including one end face directed to a rotational direction of the nut with respect to the screw shaft when the screw shaft is screwed into the nut and another one end face opposing to the above-mentioned one end face, this one end face being inclined so as to be gradually displaced, towards an outer peripheral side from an inner peripheral side of the seal member, in a direction reverse to the rotational direction with respect to a radial direction of the nut, and the another one end face extending in this radial direction of the nut or in a direction inclined to a side reverse to the one end face with respect to the radial direction of the nut.

In a preferred embodiment, the above-mentioned one end face may be inclined in the same direction as a twisted (spiral) direction of the ball rolling groove with respect to the axial direction of the nut at an inclination angle equal to or greater than a lead angle of the ball rolling groove, and the another one end face extends ir a direction perpendicular to a center line of the ball rolling groove or in a direction inclined on a side reverse to the twisted direction of the ball rolling groove from the perpendicular direction.

Some of the plural blocks may contact only the ball rolling grove at intersecting portions between inner peripheral edges of the above-mentioned one end faces and the projections of the seal member and some of other plural blocks contact only an outer peripheral surface of the screw shaft at the inner peripheral edges of the one end faces.

The seal device may comprise wiper rings mounted on both axial end portions of the nut, each of the wiper rings comprising the ring-shaped seal member having an outer periphery in which grooves are formed and spring rings fitted in the grooves for clamping the seal member in the central side thereof.

Figure 5:
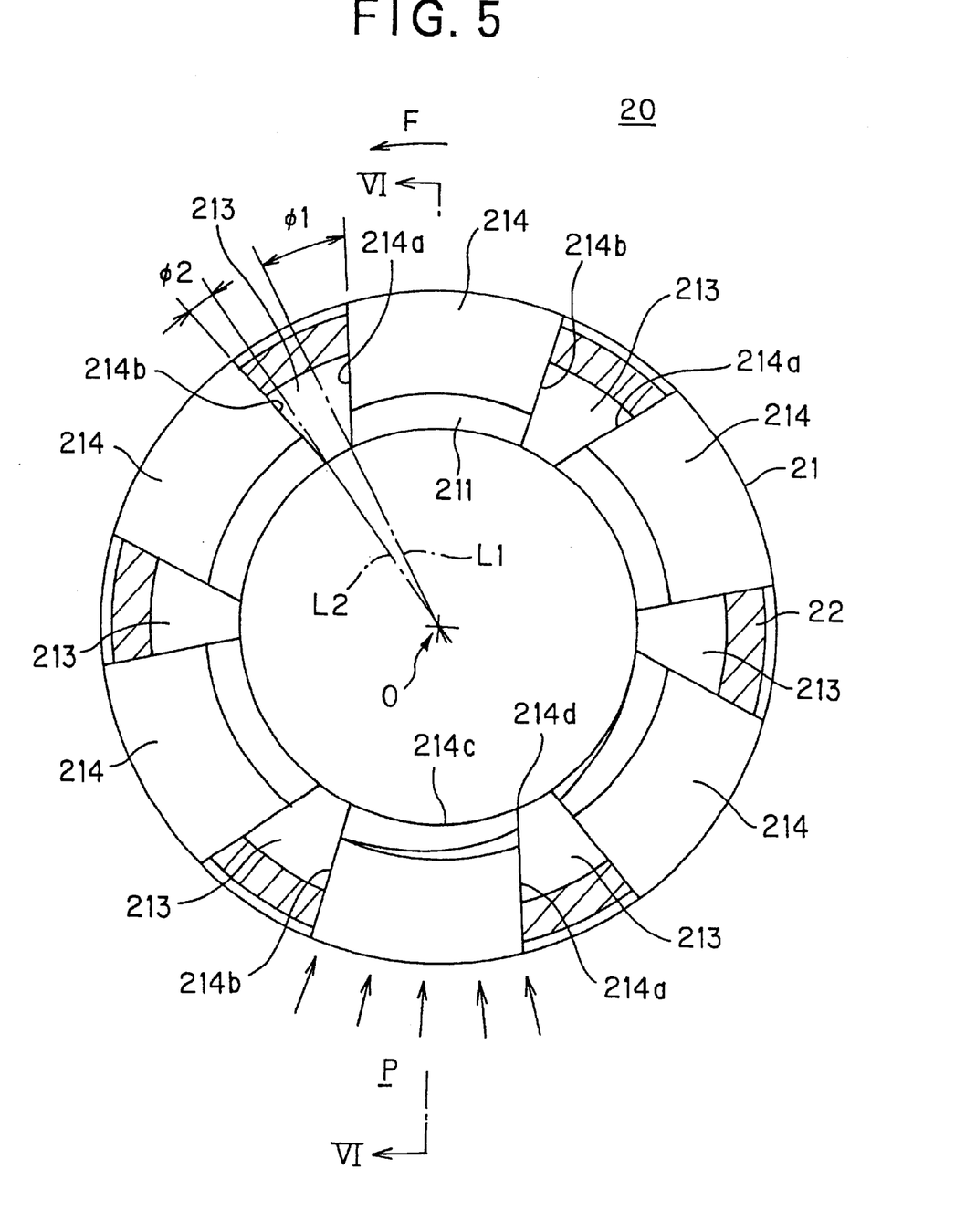
FIG. 5 is a front view of a wiper ring mounted on an axial end portion of the nut of FIG. 3.

According to the ball screw assembly of the structures mentioned above, since each of the blocks is formed in a substantially trapezoidal shape, as viewed from the axial direction of the nut, with the inner peripheral side thereof being a bottom side, even if the block is pushed in the center side as shown with an arrow P in FIG. 5, latter mentioned, the respective blocks are displaced or shifted substantially equally towards the radially central side. Therefore, there is no possibility of the inner peripheral edges of the end faces of the blocks being raised upward, and when the nut is rotated with respect to the screw shaft so that the screw shaft is screwed into the nut, foreign matters sticking on the screw shaft can be scraped by one end face (forward end face) of the respective blocks. Thus, scraped foreign matters are discharged from the seal member in accordance with the inclination of the above-mentioned end faces with respect to the radial direction of the nut.

Furthermore, according to the preferred embodiment of the present invention mentioned above, since the above-mentioned one end face is inclined with respect to the axial direction of the nut at an inclination angle equal to or greater than a lead angle of the ball rolling groove, the foreign matters scraped by the end face are kept in the slit or discharged outside in the axial direction of the nut without being taken inside in the axial direction of the nut. Further, in the case where the rotating direction of the nut is reversed to the above-mentioned direction with respect to the screw shaft, the foreign matters kept in the slit are further kept therein or discharged outside the nut by the inclination of another end face with respect to the ball rolling groove without being taken inside in the axial direction of the nut.

Furthermore, some of the plural blocks contact only the ball rolling groove at an intersecting portions between inner peripheral edges of the above-mentioned one end faces and the projections of the seal member and some of other plural blocks contact only an outer peripheral surface of the screw shaft at the inner peripheral edges of the one end faces. Even in the presence of the dimensional errors of the seal member and the screw shaft, the respective blocks of the seal member can surely contact the aimed portions of the screw shaft. Accordingly, the sealing performance can be also improved.

The nature and further characteristic features of the present invention will be made clearer from the following descriptions made with reference to the accompanying drawings.

DESCRIPTION OF THE PREFERRED EMBODIMENT

Figure 1:
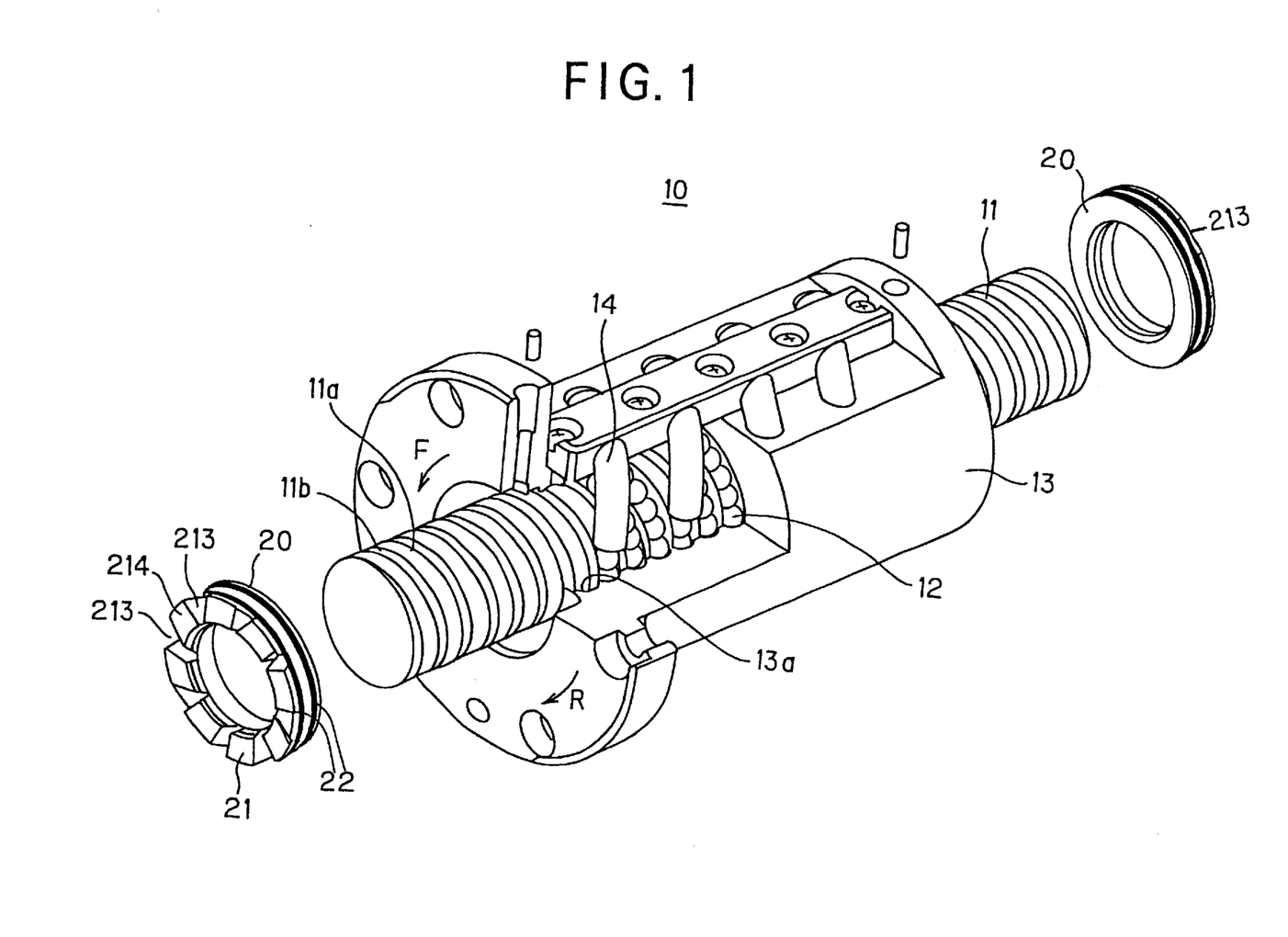
FIG. 1 is a perspective view showing a ball screw assembly to which the present invention is applied.
Figure 4:
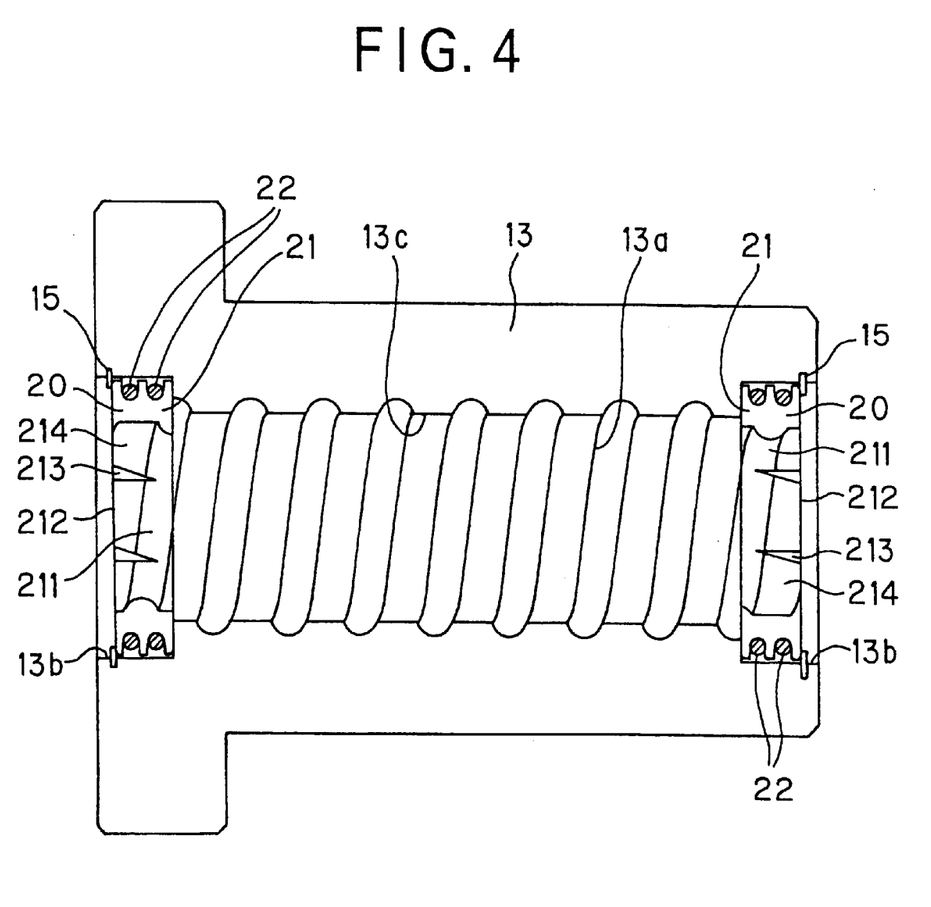
FIG. 4 shows a longitudinal section of the nut of FIG. 3.

FIG. 1 represents one preferred embodiment of a ball screw assembly to which the present invention is applied, and as is well known, the ball screw assembly 10 generally comprises a screw shaft 11, a number of balls 12 and a nut 13 which is mounted on the screw shaft 11 with the balls 12 being interposed therebetween. The nut 13 is formed with a central bore (through hole) 13c surrounded by an inner wall on which a ball rolling groove 13a is formed as best shown in FIG. 4. The balls 12 roll between a ball rolling groove 11a formed on the screw shaft 11 and the ball rolling groove 13a formed on the nut 13 in accordance with the relative rotational motion of the screw shaft 11 and the nut 13. Each ball 12 reaching to one end of the ball rolling groove 13a returns to the other end portion of the ball rolling groove 13a by way of a return tube 14.

Figure 2:
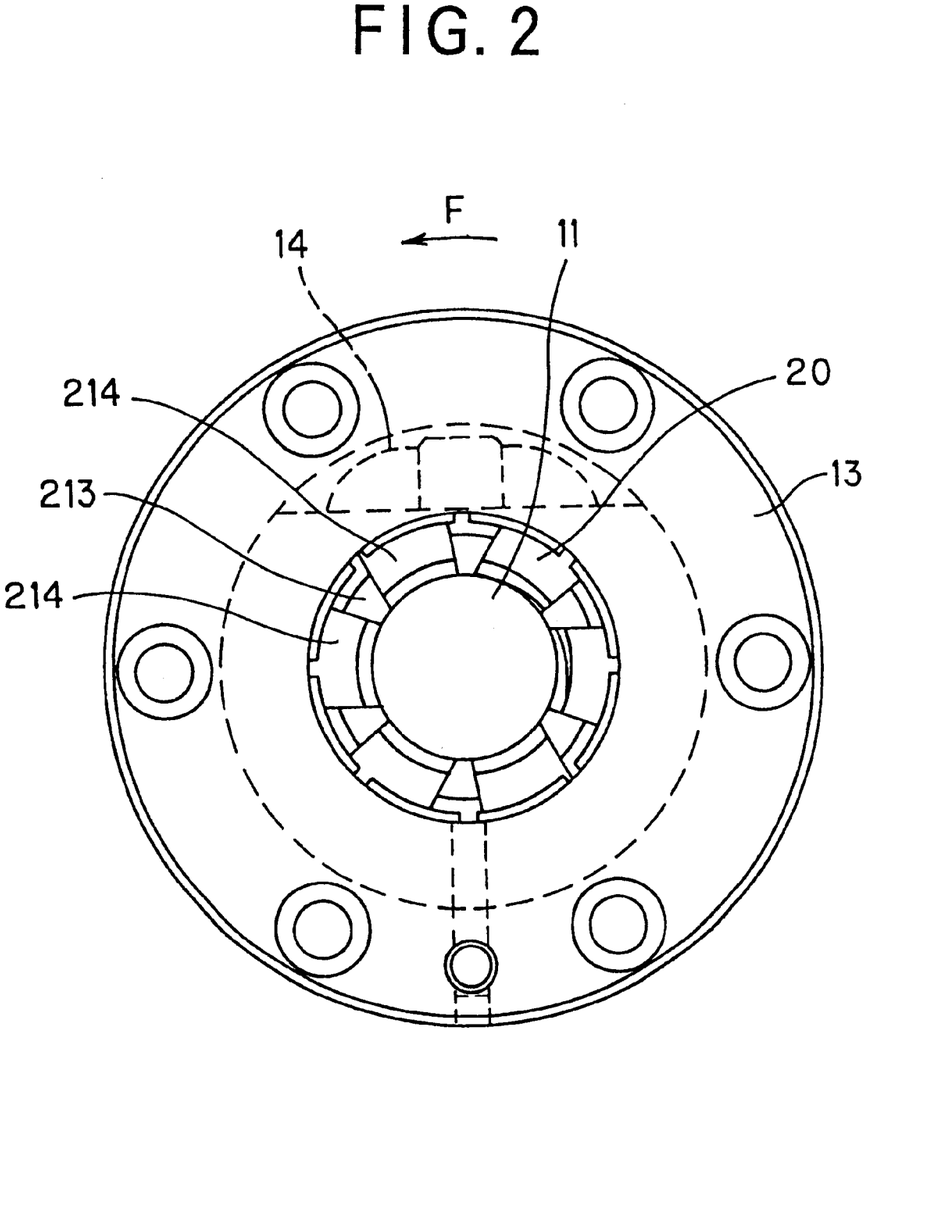
FIG. 2 is a side view seen from an axial direction of the ball screw assembly of FIG. 1.
Figure 3:
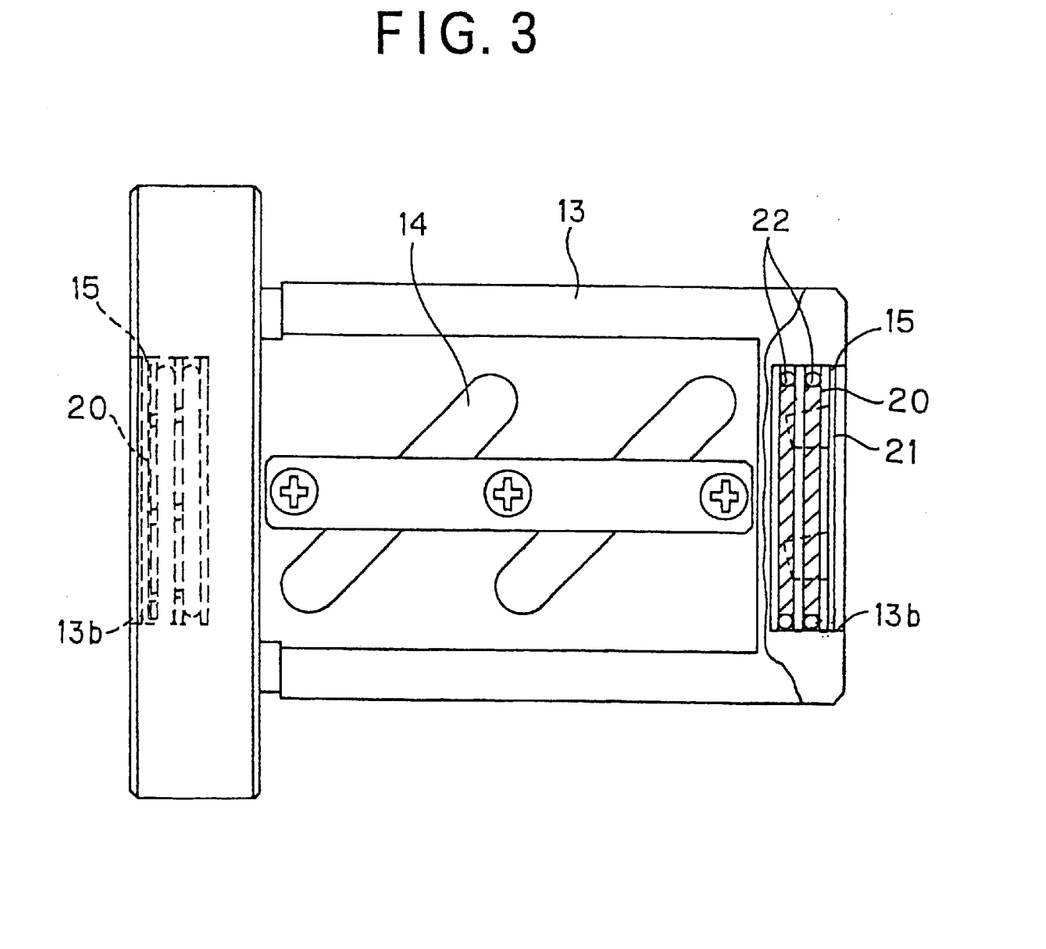
FIG. 3 is a plan view of a nut provided for the ball screw assembly.

As shown in FIGS. 2 to 4, wiper mounting holes 13b, 13b are formed on both end portions of the nut 13. Wiper rings 20, 20 are mounted on the wiper mounting holes 13b, 13b, respectively, and the wiper rings 20 are prevented from coming out by means of stopper rings 15, 5. These wiper rings 20 act as a seal device for preventing foreign matters sticking on the screw shaft 11 from invading into the nut 13 and preventing a lubricant such as grease filled in the nut 13 from leaking outward.

Figure 6:
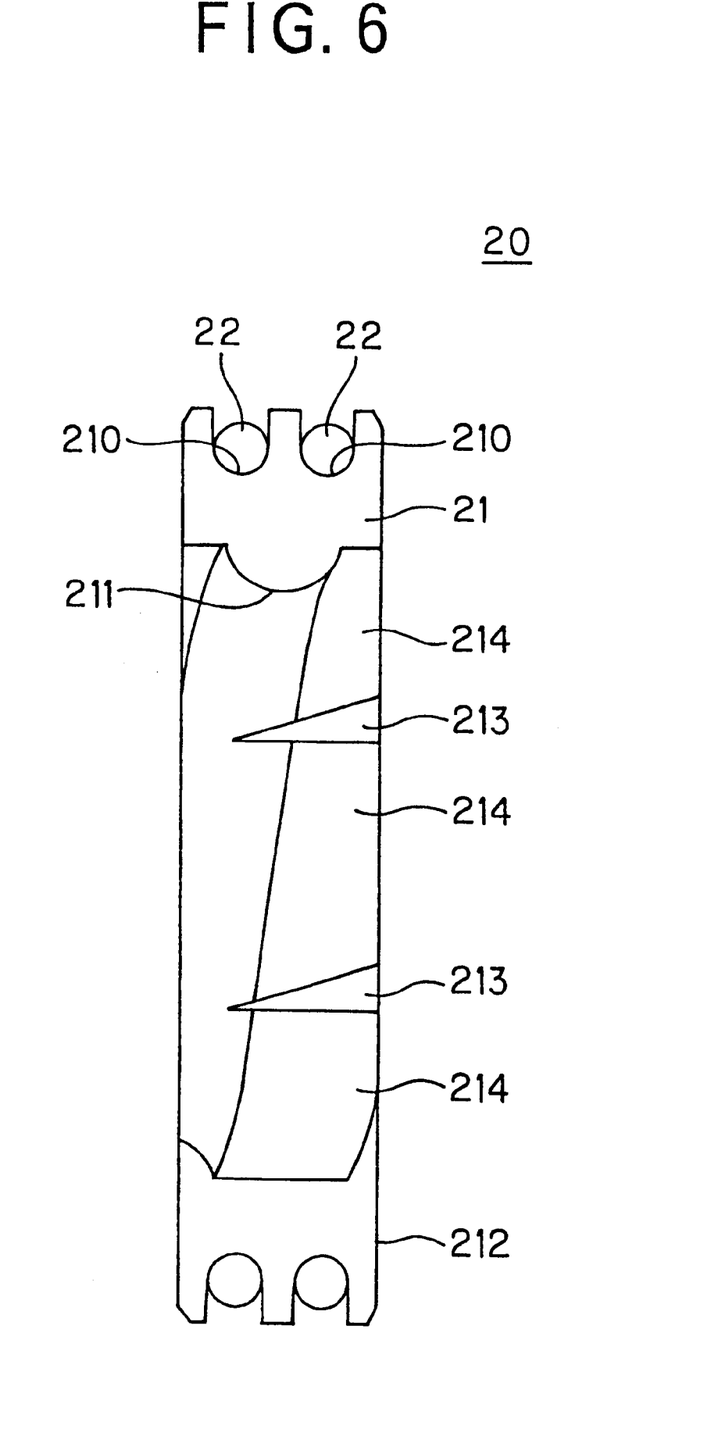
FIG. 6 is a sectional view taken along the line VI—VI in FIG. 5.
Figure 7:
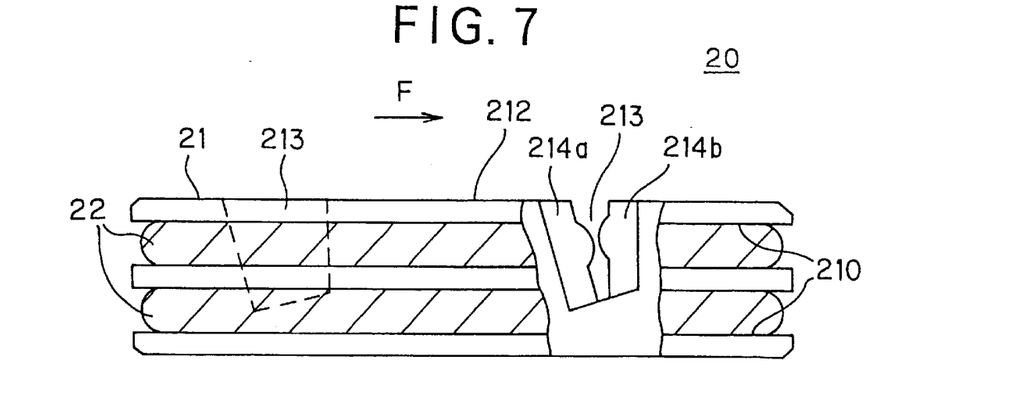
FIG. 7 is a view of the wiper ring as viewed from an upper side thereof.

With reference to FIGS. 5 to 7, each wiper ring 20 comprises a ring-shaped seal member 21 and two spring rings 22,22 fitted to its outer periphery grooves 210,210 so as to clamp the seal member 21 toward the center. The seal member 21 is manufactured by molding or cutting a synthetic resin material, and the seal member 21 is formed, at its inner peripheral surface, with a spiral projection 211 to be fitted (engaged) with the ball rolling groove 11a of the screw shaft 11.

The seal member 21 is formed with a plurality of slits 213, 213, - - - , 213, each extending from one side face 212 of the seal member 21 to an intermediate portion thereof in the axial direction. These slits 213 are formed in the circumferential direction of the seal member 21 with the constant distance from each other, so that the seal member 21 is divided into a plurality of blocks 214, 214, - - - , 214 in the circumferential direction thereof by the location of such slits 213. Further, although the seal member 21 is divided into six blocks 214 in the illustrated embodiment, the block numbers to be divided may be optionally changed as occasion demands.

Then, with reference to FIG. 5, each of the block 214 is formed with a pair of end faces 214a and 214b with respect to the circumferential direction thereof. One end face 214a, which is directed to the rotational direction (direction of an arrow F in FIG. 1, 2, 5, 7 or 8) of the nut 13 with respect to the screw shaft 11 when the screw shaft 11 is screwed into the nut 13, is inclined so as to be gradually displaced, in a direction reverse to the forward rotational direction with respect to the radial direction of the nut 13, as being displaced towards the outer peripheral side of the end face 214a from the inner peripheral side thereof. In this meaning, hereinlater, the rotational direction of the nut 13 shown with the arrow F is called "forward rotational direction" and this one end face 214a is called "forward end face".

The other end face 214b of the block 214 facing the forward end face 214a thereof is called "rearward end face" hereinlater, and he rearward end face 214b is inclined so as to be gradually displaced in the forward rotational direction with respect to the radial direction of the nut 13 as being displaced towards the outer peripheral side of the rearward end face from the inner peripheral side thereof. According to such structure, the width of the slit 213 is gradually widened towards the outer peripheral side thereof.

The radial direction of the nut 13 accords with those of dimensional lines L1 and L2 passing the center of the seal member 1. Further, the inclination φ2 of the rearward end face 214b may be made zero angle (0°), that is, the rearward end face 214b may be formed as a plane surface extending in the radial direction of the nut 13.

Figure 8:
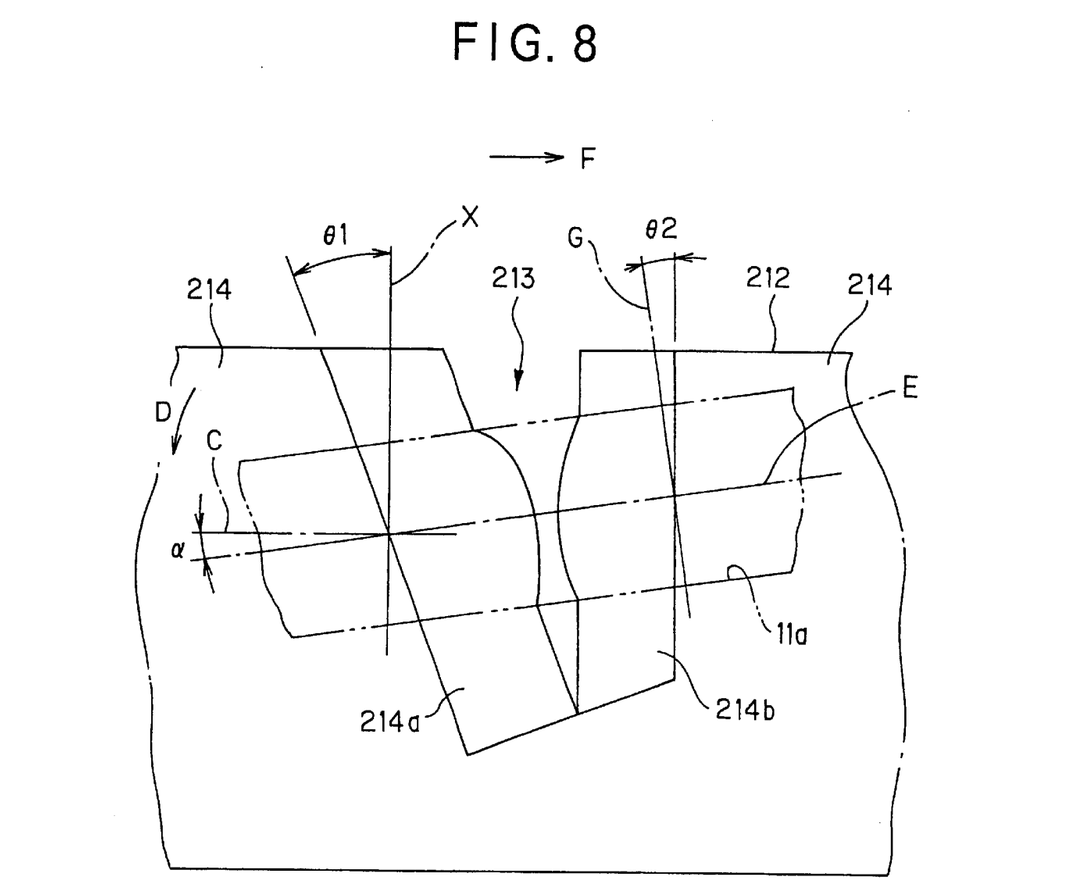
FIG. 8 is an enlarged view of a slit formed on the wiper ring, seen from th e outer peripheral side thereof.

As clearly shown in FIG. 8, the forward end face 214a is inclined in the twisted (spiral) direction of the ball rolling groove 11a with respect to the axial direction X of the nut 13. Namely, when the ball rolling groove 11a is inclined at a lead angle of α in a predetermined twisted direction thereof with respect to the direction of line C perpendicular to the axial direction of the nut 13, the forward end face 214a is inclined at the predetermined angle θ1 in the same direction as the twisted direction D with respect to the axial direction X of the nut 13. Further, it is desired that this inclination angle θ1 is set to be larger than the lead angle α to positively discharge, outward in the axial direction of the nut 13, the foreign matters on the screw shaft 11 which is scraped by the forward end faces 214a.

Figure 11:
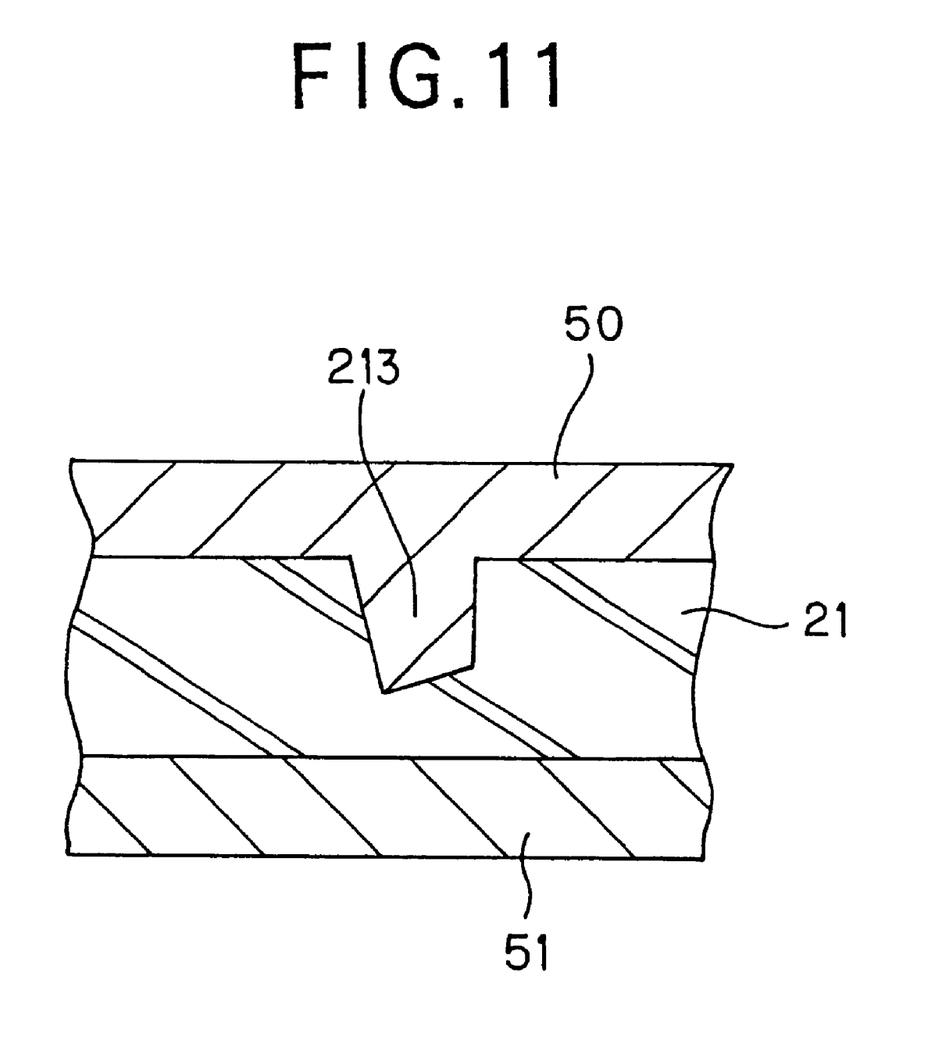
FIG. 11 is a partial sectional view showing a structure for injection molding of the seal member provided for the wiper ring of FIG. 5.

On the other hand, the rearward end face 214b is inclined at a predetermined angle of θ2 in the direction reverse to the twisted direction D with respect to the direction (direction of line G) perpendicular to the center line E of the ball rolling groove 11a. Further, it is desired that the inclination angle θ2 is set to be equal to or larger than the lead angle α. In the case of setting the angle θ2 to be equal to the lead angle α, the rearward end face 214b is substantially parallel to the axial direction of the nut 13. On the other hand, in the case of setting the angle θ2 to be larger than the lead angle α, any undercut will not be caused in the slit 213 as shown in FIG. 11, when the seal member 21 is formed through the injection molding process by using a pair of mold halves 50 and 51 which are mated in the axial direction of the seal member 21. According to such process, the number of parts of the mold to be used, and time and labour for the injection molding will decrease, resulting in manufacturing cost reduction.

As is clearly understood by FIG. 4, the wiper ring 20 is mounted on the nut 13 so that the side surface 212, at which the slits 213 are opened, is directed outward in the axial direction of the nut 13.

Figure 9:
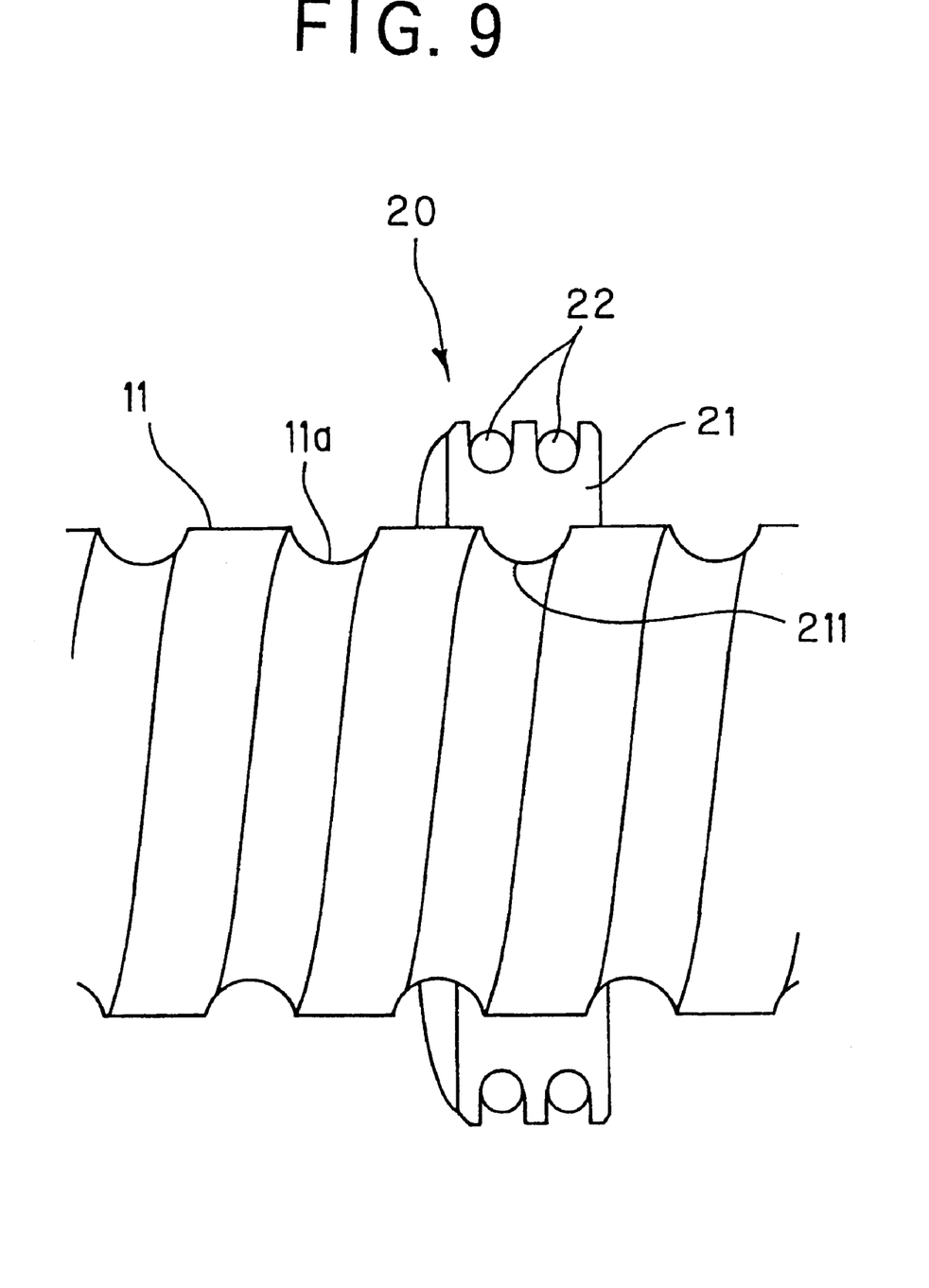
FIG. 9 is a view showing a state that the wiper ring of FIG. 5 is mounted on a screw shaft.
Figure 10A:
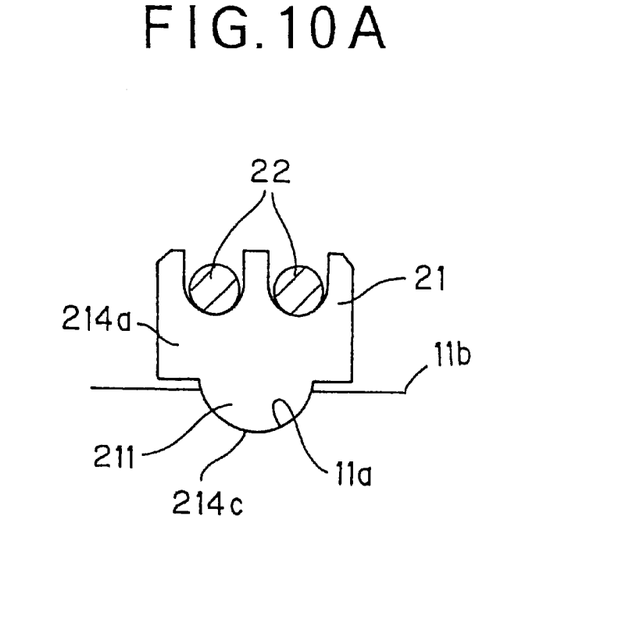
FIGS. 10A and 10B show contacting conditions between a block provided for a seal member of the wiper ring and the screw shaft.
Figure 10B:
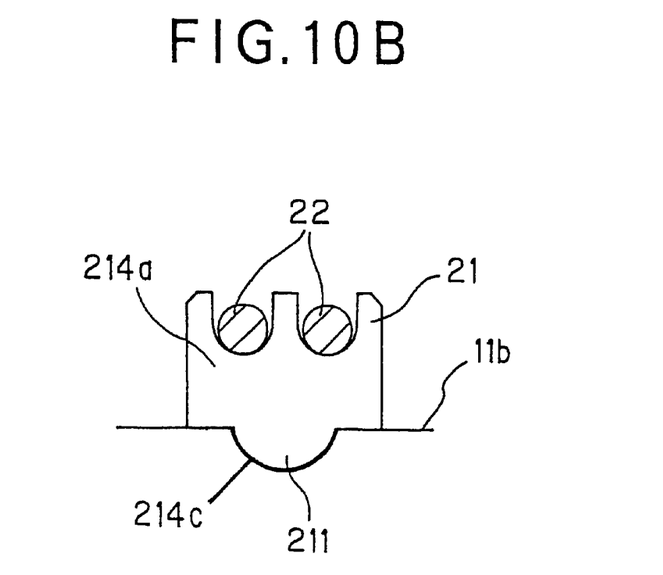

FIG. 9 shows the contacting state between the screw shaft 11 and the wiper ring 20 fitted on the nut 13. According to the pressing force of the spring rings 22, 22 mounted on the outer periphery of the seal member 21, the respective blocks 214 are pressed against the screw shaft 11. The contacting state between the seal member 21 and the screw shaft 11 will change according to the type of the blocks 214. That is, as shown in FIG. 10A, certain ones (or one) of the blocks 214 contact only the ball rolling groove 11a at portions at which the inner peripheral edges 214c of the forward end faces 214a are intersected with the projection 211, and do not contact the outer peripheral surface 11b of the screw shaft 11. Further, as shown in FIG. 10B, with the remaining blocks, the inner peripheral edges 214c of the forward end faces 214a of these blocks 214 contact only the outer peripheral surface 11b of the screw shaft 11 and do not contact the ball rolling groove 11a. In order to impart the variation to such contacting positions, for example, the curvatures of the inner peripheries of the respective blocks 214 or the side of the projection 211 may be changed with the respective blocks 214. Further, the blocks 214 which contact the ball rolling groove 11a and the blocks 214 which contact the outer peripheral surface 11b of the screw shaft 11 may be arranged alternately in the circumferential direction of the seal member 21 or may be arranged randomly. However, it will be better to take arrangement such that the block 214, having a remaining cylindrical surface portion opposing to the outer peripheral surface of the screw shaft 11 at both sides of the projection 21, i.e. the block 214 whose projection 211 is not cut away, preferentially contacts the ball rolling groove 11a.

According to the wiper ring 20 of the structure mentioned above, in the case where the nut 13 is rotated in the forward (advancing) rotational direction mentioned hereinbefore with respect to the screw shaft 11, the foreign matters sticking on the screw shaft 11 are scraped by the forward end faces 214a of the blocks 214 facing the rotational direction, and the scraped foreign matters are discharged in the axial direction of the nut 13 and in the outer peripheral side in accordance with the inclination angles of the forward end faces 214a of the blocks 214.

As shown in FIG. 5, since each of the blocks 214 is formed in a trapezoidal shape with the bottom side being the inner peripheral side as viewed from the axial direction of the nut 13, the force P of the spring rings 22 for pushing the respective blocks 214 towards the center side of the nut can be surely supported by the portions between the inner peripheries of the respective blocks 214 and the screw shaft 11. Accordingly, any force for raising the inner peripheral edges 214c of the forward end faces 214a of the blocks 214 from the screw shaft 11 cannot be generated, and hence, the inner peripheral edges 214c of the forward end faces 214a, which are most important for scraping the foreign matters sticking on the screw shaft 11, can be surely pushed against the screw shaft 11.

Since the blocks 214 are separated into ones contacting the ball rolling groove 11a of the screw shaft 11 and ones contacting the outer peripheral surface 11b of the screw shaft 11, the respective blocks 214 can surely contact the aimed portions of the screw shaft 11 even in the presence of the dimensional error of the seal member 21 or the screw shaft 11. Therefore, it is not particularly necessary to work the seal member 21 with a high precision, and hence, the working can be easily performed, resulting in manufacturing cost reduction.

It is to be noted that the present invention is not limited to the described embodiment and many other changes and modifications may be made without departing from the scopes of the appended claims.

For example, in the embodiment described above, although the end faces 214a and 214b of the blocks 214 incline to the radial direction of the nut 13 and in the direction perpendicular to the center line of the ball rolling groove 11a, an alternation in which the end faces 214a and 214b incline only to the radial direction of the nut 13 may be adopted, and in such alternation, the inner peripheral surfaces of the forward end faces 214a of the blocks 214 can be surely pushed against the screw shaft.

What is claimed is:

1. A ball screw assembly comprising:

a screw shaft formed, at an outer periphery thereof, with a bell rolling groove in shape of spiral;

a number of balls rolling along the ball rolling groove of the screw shaft;

a nut screwed with the screw shaft to be relatively rotatable with the balls being interposed therebetween; and a seal device including seal members mounted on both axial end portions of the nut, said seal member being formed in shape of ring having inner periphery to which a spiral projection to be fitted to the ball rolling groove is formed, wherein a portion of each of said seal member is divided into a plurality of blocks in a circumferential direction thereof by a plurality of slits formed to the seal member so as to extend from one end surface directing outward in an axial direction of the nut to an axial intermediate portion of the seal member, each of said blocks having a pair of end faces in the circumferential direction, said end faces including one end face directed to a rotational direction of the nut with respect to the screw shaft when the screw shaft is screwed into the nut and another one end face opposing to said one end face, said one end face being inclined so as to be gradually displaced, towards an outer peripheral side from an inner peripheral side of the seal member, in a direction reverse to said rotational direction with respect to a radial direction of the nut, and said another one end face extending in said radial direction of the nut or in a direct on inclined to a side reverse to said one end face with respect to said radial direction of the nut.

2. The ball screw assembly according to claim 1, wherein said one end face is inclined in the same direction as a twisted direction of the ball rolling groove with respect to the axial direction of the nut at an inclination angle equal to or greater than a lead angle of the ball rolling groove, and said another one end face extends in a direction perpendicular to a center line of the ball rolling groove or in a direction inclined on a side reverse to said twisted direction of the ball rolling groove from the perpendicular direction.

3. The ball screw assembly according to claim 1, wherein some of said plural blocks contact only said ball rolling groove at intersecting portions between inner peripheral edges of said one end faces and said projections and some of other said plural blocks contact only an outer peripheral surface of the screw shaft at the inner peripheral edges of said one end faces.

4. The ball screw assembly according to claim 1, wherein said seal device comprises of wiper rings mounted on both axial end portions of the nut, each of said wiper rings comprising the ring-shaped seal member having an outer periphery in which grooves are formed and spring rings fitted in the grooves for clamping the seal member between the spring rings and the screw shaft.

5. The ball screw assembly according to claim 2, wherein some of said plural blocks contact only said ball rolling groove at intersecting portions between inner peripheral edges of said one end faces and said projections and some of other said plural blocks contact only an outer peripheral surface of the screw shaft at the inner peripheral edges of said one end faces.

6. The ball screw assembly according to claim 2, wherein said seal device comprises of wiper rings mounted on both axial end portions of the nut, each of said wiper rings comprising the ring-shaped seal member having an outer periphery in which grooves are formed and spring rings fitted in the grooves for clamping the seal member between the spring rings and the screw shaft.

7. The ball screw assembly according to claim 3, wherein said seal device comprises of wiper rings mounted on both axial end portions of the nut, each of said wiper rings comprising the ring-shaped seal member having an outer periphery in which grooves are formed and spring rings fitted in the grooves for clamping the seal member between the spring rings and the screw shaft.

8. The ball screw assembly according to claim 5, wherein said seal device comprises of wiper rings mounted on both axial end portions of the nut, each of said wiper rings comprising the ring-shaped seal member having an outer periphery in which grooves are formed and spring rings fitted in the grooves for clamping the seal member between the spring rings and the screw shaft.

* * * * *